United States Patent [19]

Ledieu

[11] Patent Number: 5,622,815

[45] Date of Patent: Apr. 22, 1997

[54] PROCESS OF MANUFACTURE OF A MASTER DISK AND/OR OF AN OPTICAL DISK

[75] Inventor: Jean Ledieu, Crespieres, France

[73] Assignee: Digipress, Caen, France

[21] Appl. No.: 391,943

[22] Filed: Feb. 21, 1995

[30]   Foreign Application Priority Data

Feb. 21, 1994 [FR]   France .................................. 94 01941

[51] Int. Cl.⁶ ........................................................ G11B 7/26
[52] U.S. Cl. ........................... 430/320; 430/321; 430/945; 216/17; 216/24
[58] Field of Search ................................... 430/320, 321, 430/945; 216/24, 17

[56]   References Cited

U.S. PATENT DOCUMENTS

| | | | |
|---|---|---|---|
| 4,839,251 | 6/1989 | Ohta et al. ....................................... | 430/5 |
| 5,147,763 | 9/1992 | Kamitakahara .......................... | 430/320 |
| 5,149,607 | 9/1992 | De Graaf et al. ......................... | 430/17 |
| 5,330,880 | 7/1994 | Horigome et al. ...................... | 430/321 |

FOREIGN PATENT DOCUMENTS

| | | |
|---|---|---|
| 0176684 | 9/1992 | European Pat. Off. . |
| 0503961 | 9/1992 | European Pat. Off. . |
| 0553013 | 7/1993 | European Pat. Off. . |

*Primary Examiner*—John A. McPherson
*Attorney, Agent, or Firm*—Pennie & Edmonds

[57]   ABSTRACT

The invention concerns a preformatted substrate, a preformatted substrate comprising information to be duplicated, as well as their processes of manufacture and a process of manufacture of a master disk and/or an optical disk. The preformatted substrates are constituted of a support coated with a layer of resin sensitive to at least one stress comprising on its surface a first succession of micropits or first groove representative of the preformatting signal, the depth of these micropits or groove being smaller than the thickness of the layer of photosensitive resin. These substrates may be used in the field of information archiving and in the field of manufacture of optical disks.

11 Claims, 1 Drawing Sheet

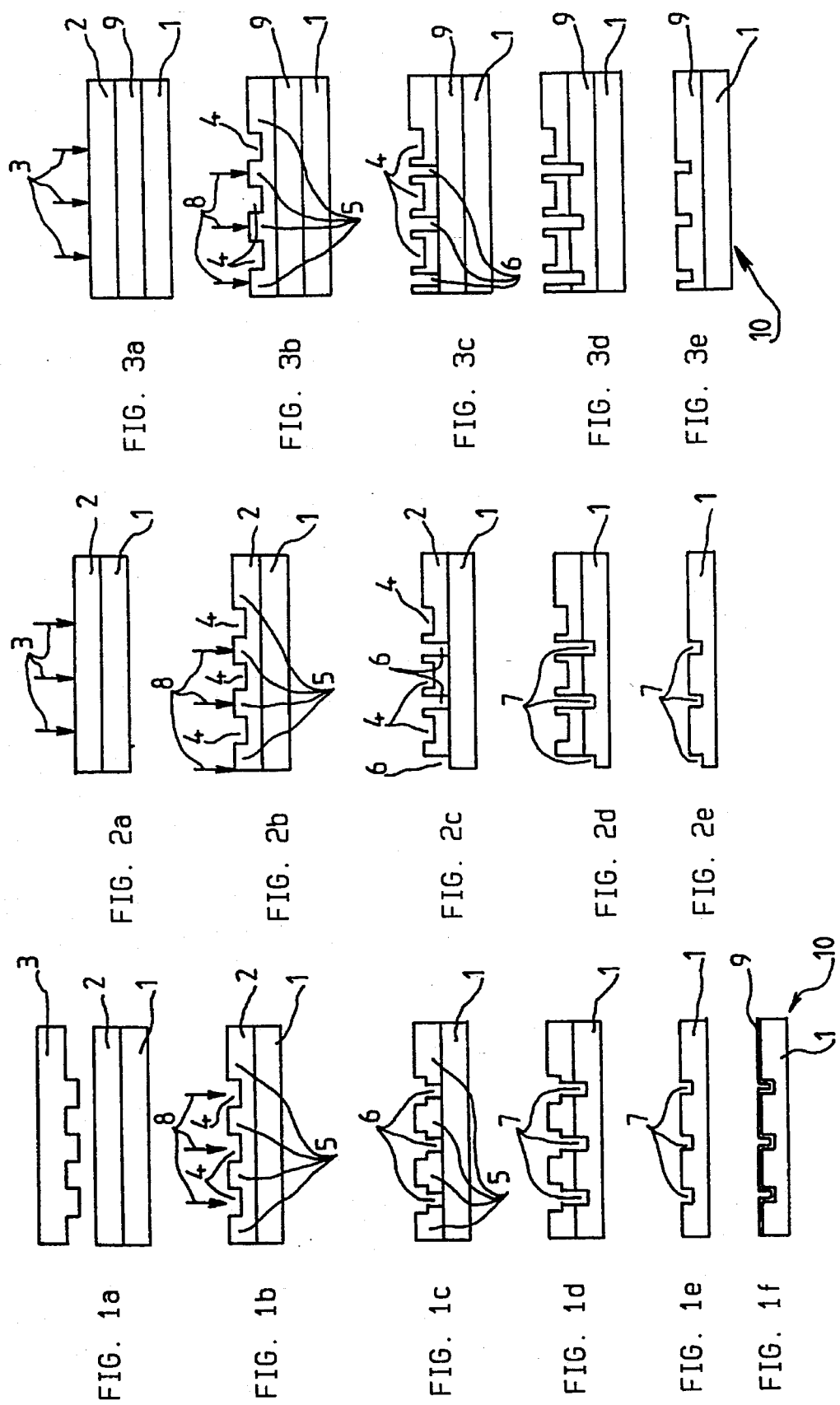

PROCESS OF MANUFACTURE OF A MASTER DISK AND/OR OF AN OPTICAL DISK

The present invention concerns a preformatted substrate, a preformatted substrate comprising information to be duplicated as well as a process of manufacture of a preformatted substrate, and a process of manufacture of a preformatted substrate comprising information to be duplicated. It also concerns a process of manufacture of a master disk and/or an optical disk.

The optical disks of WORM type are made of a preformatted substrate, generally made of polycarbonate, coated with one or more sensitive layers which modify upon contact with a beam emitted by a laser diode whereby micropits are obtained through ablation and are representative of the information to be recorded.

One knows a process for preformatting a substrate comprising performing a pre-etching of this substrate through pressing a nickel die, pre-etching of a groove which allows the accurate guiding of the beam issued from the laser diode, by controlling its radial positioning in order to accurately follow the track formed by the groove. This pre-etching (or preformatting) may integrate a time base, able to allow the automatic control of the speed of rotation of the substrate, this time base being constituted either by a wobbulation in the continuous groove, or from formats already specified notably in international standards (sampled format or continuous composite format.)

Besides, one knows a process comprising using a commercial WORM recorder to record and etch information on glass optical disks, or to manufacture master disks onto which information is etched, these master disks enabling the manufacture of dies usable for pressing optical disks. One also uses, in this process, preformatted substrates, these preformatted substrates being obtained in the same way as previously.

But, with these processes, the master disks, the pressing dies and therefore the obtained optical disks comprise not only the information to be duplicated and/or to be read but also the preformatting signal, thereby disturbing the reading of the information.

The invention aims to cope with this drawback by proposing a preformatted substrate usable for the manufacture of optical disks and for the manufacture of optical disks enabling the manufacture of dies usable for pressing optical disks.

For this purpose, the invention concerns a preformatted substrate constituted of a support coated with a layer of a resin sensitive to at least one stress, this layer of sensitive resin comprising a first succession of micropits or first groove on its surface, representative of the preformatting signal, the depth of these micropits or groove is smaller than the thickness of the layer of sensitive resin.

It also relates to a preformatted substrate comprising information to be duplicated constituted of a support coated with a layer of resin sensitive to at least one stress, this layer of sensitive resin comprising a first succession of micropits or first groove representative of the preformatting signal, the depth of which is smaller than the thickness of the layer of sensitive resin, and a second succession of micropits representative of the information to be duplicated the depth of which is equal to the thickness of the layer of sensitive resin in the zones where they are created.

According to a first embodiment of the preformatted substrate comprising information according to the invention, the second succession of micropits is located within the zones of resin under the first succession of micropits or first groove.

According to another embodiment of the preformatted substrate comprising information, the second succession of micropits is located within zones of resin different from those located under the first succession of micropits or first groove.

According to one feature of the preformatted substrates and preformatted substrates comprising information according to the invention, the thickness of the layer of sensitive resin is comprised between about 100 nm and about 1 μm and the depth of the micropits of the first succession of micropits or first groove is of about 75 nm.

According to one embodiment of the preformatted substrates and preformatted substrates comprising information to be duplicated according to the invention, the support is made of dealkalinized and/or tempered glass.

According to another embodiment of the preformatted substrates and preformatted substrates comprising information according to the invention, the support is made of aluminium.

According to still another embodiment of the preformatted substrates and preformatted substrates comprising information to be duplicated according to the invention, the support is made of a hard, reflecting in the near infrared range and conductive material.

If the support of the preformatted substrates and preformatted substrates comprising information according to the invention is made of dealkalinized and/or tempered glass or of aluminium, the preformatted substrates and preformatted substrates comprising information may furthermore comprise a layer of a hard, reflecting in the near infrared range and conductive material located between the support and the layer of sensitive resin.

The hard, reflecting in the near infrared range and conductive material is selected from a nitride or carbonitride of zirconium, hafnium or titanium.

The invention also relates to a process of manufacture of a preformatted substrate which comprises the steps of : depositing onto a support a layer of a resin sensitive to at least one stress; and transferring the preformatting signal into the layer of sensitive resin, this transfer leading to the creation of a first succession of micropits or first groove representative of the preformatting signal, the depth of these micropits or groove being smaller than the thickness of the layer of resin, by applying a first stress.

It also concerns a process of manufacture of a preformatted substrate comprising information to be duplicated comprising the steps of depositing on a support a layer of a resin sensitive to at least one stress; transferring into the layer of sensitive resin the preformatting signal, this transfer achieving the creation of a first succession of micropits or first groove representative of the preformatting signal, the depth of these micropits or groove being smaller than the thickness of the layer of sensitive resin by applying a first stress; and recording into the layer of sensitive resin the information to be duplicated, by applying a second stress, this recording leading to the creation of a second succession of micropits representative of the information to be duplicated, the depth of these micropits being equal to the thickness of the layer of sensitive resin within the zones where they are created.

The invention further relates to a process of manufacture of a master disk or an optical disk comprising the steps of depositing a layer of resin sensitive to at least one stress onto a substrate; transferring into the layer of sensitive resin the preformatting signal, by applying a first stress, this transfer leading to the creation of a first succession of micropits or first groove representative of the preformatting signal, the depth of these micropits or groove being smaller than the thickness of the layer of sensitive resin; recording into the layer of sensitive resin the information to be duplicated, by applying a second stress, this recording leading to the creation of a second succession of micropits representative of the information to be duplicated, the depth of these micropits being equal to the thickness of the layer of sensitive resin within the zones where they are created; transferring the information into the support by plasma etching or chemical attack; and removing the zones of residual resin, the master disk or the optical disk thus obtained comprising the information to be duplicated only and not the preformatting signal.

According to one feature of the process of manufacture of a master disk or an optical disk according to the invention, one deposits a layer of a hard, reflecting in the near infrared range and conductive material on the succession of micropits formed into the support, after the step of removing the residual resin.

According to a first alternative of the processes of manufacture of a preformatted substrate comprising information and of the processes of manufacture of a master disk or an optical disk according to the invention, the recording of the information is performed within zones of resin located under the first succession of micropits or first groove.

According to another alternative of the processes of manufacture of a preformatted substrate comprising information to be duplicated and of the processes of manufacture of a master disk or an optical disk according to the invention, the recording of the information is performed within zones of resin different from those located under the first succession of micropits or first groove.

According to a characteristic of the processes of manufacture of a preformatted substrate, of a preformatted substrate comprising information and of a master disk or of an optical disk according to the invention, the thickness of the layer of resin sensitive to at least one stress is comprised between about 100 nm and about 1 µm, and the depth of the first succession of micropits or first groove is of about 75 nm.

According to an embodiment of the processes of manufacture of a preformatted substrate, of a preformatted substrate comprising information and of a master disk or of an optical disk according to the invention, the support is made of glass.

According to another embodiment of the processes of manufacture of a preformatted substrate, of a preformatted substrate comprising information and of a master disk or of an optical disk according to the invention, the support is made of aluminium.

According to still another embodiment of the processes of manufacture of a preformatted substrate, of a preformatted substrate comprising information and of a master disk or of an optical disk according to the invention, the support is made of a hard, reflecting in the near infrared range and conductive material.

If the support is not made of a hard, reflecting in the near infrared range and conductive material, one will integrate in the processes of manufacture of the invention a step of depositing a layer of a hard, reflecting in the near infrared range and conductive material onto the support, prior to performing the step of depositing the layer of sensitive resin.

In this case, in the process of manufacture of a master disk or of an optical disk according to the invention, the transfer of the information will then be effected into this layer of hard, reflecting in the near infrared range and conductive material.

According to another characteristic of the processes of manufacture of a preformatted substrate, of a preformatted substrate comprising information, of a master disk or of an optical disk according to the invention, the hard, reflecting in the near infrared range and conductive material is selected from a nitride or carbonitride of zirconium, hafnium or titanium.

Other characteristics, details and advantages of the invention will appear more clearly in the course of the detailed description which follows and which refers to the appended figures in which:

FIG. 1 schematically illustrates a first way to carry out the process of manufacture of a master disk and/or of an optical disk according to the invention;

FIG. 2 schematically illustrates a second way to carry out the process of manufacture of a master disk and/or of an optical disk according to the invention; and FIG. 3 schematically illustrates a third way to carry out the process of manufacture of a master disk and/or of an optical disk according to the invention.

The preformatted substrates of the invention are constituted of a support with smooth surfaces, i.e. not comprising any rugosity higher than 50Å, one of the faces of the support is coated with a layer of a resin sensitive to at least one stress, this layer of resin comprising a first succession of micropits or first groove the depth of which is smaller than the thickness of the layer of sensitive resin. More particularly, the support will be constituted of a tempered and/or dealkalinized glass. It also can be constituted of aluminium. It can still be constituted of a hard, reflecting in the near infrared range and conductive material. In cases where the support is not constituted of a hard, reflecting in the near infrared range and conductive material, the preformatted substrate of the invention could, furthermore, comprise a layer of such a material between the layer of sensitive resin and the support.

This material will more particularly be selected from a nitride or carbonitride of zirconium, hafnium or titanium.

Different means may be used to form the first succession of micropits or first groove representative of the preformatting signal. It should be noted that the terms "first succession of micropits or first groove" such as used herein means that the preformatting signal may be under the form of a succession of micropits as well as under the form of a continuous groove.

A first means consists in applying a pressing die on the layer of sensitive resin, this pressing die comprising microreliefs representative of the preformatting signal under a negative form. By pressing this die into the layer of sensitive resin, one will directly obtain the desired first succession of micropits or first groove.

One also may create the first succession of micropits or first groove by insolating the layer of sensitive resin through a mask comprising the preformatting signal. The zones of insolated resin are then removed by any appropriate means as for example a chemical attack, and this will a depth smaller than the thickness of the layer of sensitive resin.

The first succession of micropits or first groove may also be created by irradiation of some zones of the layer of sensitive resin, by having a light beam, for example emitted by a laser source, modulated according with the preformatting signal, moving past. Once again, the zones of insolated resin will then be removed, by a chemical attack, with a depth smaller than the thickness of the layer of sensitive resin.

The thickness of the layer of sensitive resin, whatever be the means used to create the first succession of micropits or first groove, is comprised between about 100 nm and about 1 µm and the depth of the micropits of the first succession of micropits or first groove is of about 75 nm.

The preformatted substrates of the invention are then usable for the recording of information with any type of recorders necessitating a preformatted substrate. More particularly one could use a recorder of the WORM type to record the information.

The information can be recorded into the remaining zones of resin located under the first succession of micropits or in zones different therefrom.

In the case where one records the information to be duplicated into the zones of resin located under the first succession of micropits by an irradiation and where the recording of the preformatting signal is effected by irradiation, this irradiation will be made for example with a low level radiation such that the resin located under the first succession of micropits or first groove is not desactivated.

The information may be recorded, as in the case of the preformatting signal, by pressing a die comprising micropits representative of the information to be recorded and to be duplicated under a negative form, or by an irradiation through a mask comprising the information to be recorded and to be duplicated followed by a step of removing by chemical attack the zones of resin thus irradiated or also by having a light beam modulated in accordance with the signal to be recorded and to be duplicated moving past also followed by a step of removing the zones of insolated resin. Thus one has created a second succession of micropits representative of the information to be duplicated.

The depth of the micropits constituting this second succession of micropits will have to be equal to the thickness of the layer of sensitive resin into which they are created. Thus, the preformatted substrate comprising the information to be duplicated of the invention will be constituted of a support coated with a layer of photosensitive resin comprising a first succession of micropits or first groove the depth of which is smaller than the thickness of the layer of sensitive resin and a second succession of micropits the depth of which is equal to the thickness of the sensitive layer within the zones into which they are created. Otherwise stated, the depth of the micropits of the second succession of micropits, representative of the information to be duplicated, will go down to the surface of the support.

Of course, the support may be constituted of any material cited above for the preformatted substrate previously described. And, if the support is not constituted of a hard, reflecting in the near infrared range material but coated with a layer of this material, the depth of the micropits of the second succession of micropits will go down to the surface of this material.

The preformatted substrates and the preformatted substrates comprising information according to the invention are then used for the realization of optical disks or of master disks enabling the manufacture of pressing dies for the manufacture of optical disks, which will comprise the information only and not the preformatting signal.

Indeed, after realization of the preformatted substrate comprising the information, only the information are transferred into the support, by chemical etching or by reactive plasma, and all the residual resin is removed by chemical attack or by any other appropriate means.

When the support is not constituted of a hard material, reflecting in the near infrared range and conductive material or is not coated with the hard, reflecting and conductive material, one may, after the step of removing the residual resin, coat the obtained master disk with a layer of such a hard, reflecting in the near infrared range and conductive material.

To make the subject matter of the invention better understandable, several embodiments will now be described by way of purely illustrative and non limiting examples of several embodiments of the invention.

EXAMPLE 1

Referring to FIG. 1, preformatted substrates, preformatted substrates comprising information and master disks or optical disks according to the invention as well as a first way to carry out the processes of manufacture of the preformatted substrates, of the preformatted substrates comprising information and of the master disks of the invention will be described in the following.

In the first step marked (a) in FIG. 1, one deposits onto a support 1 made of dealkalinized or tempered glass a layer 2 of photosensitive resin having a thickness of 200 nm. By applying a pressing die 3, one records into this layer 2 of photosensitive resin the preformatting signal. One presses the pressing die 3 down to a depth of 75 nm into the layer 2 of photosensitive resin.

As illustrated in step (b) of FIG. 1, one thus obtains a preformatted substrate constituted of the support 1 made of dealkalinized and/or tempered glass coated with the layer 2 of photosensitive resin comprising at its surface a first succession of micropits or first groove 4 and zones 5 of resin. Then one records by moving past a laser beam 8 modulated in accordance with the signal to be recorded, the information to be duplicated, within the zones located under the micropits or groove 4.

Then one removes the insolated zones of resin, down to the surface of the support 1.

One thus obtains the preformatted substrate comprising information illustrated in step (c). This preformatted substrate comprising the information is constituted of the support 1 coated with the layer of photosensitive resin comprising on its surface a first succession of micropits or first groove representative of the preformatting signal having a depth of 75 nm and under this first succession of micropits or groove 4, a second succession of micropits 6 the depth of which is of 200 nm, and zones 5 of residual resin.

In step (d), one transfers into the support 1 by etching by a reactive plasma, only the information to be duplicated, i.e. one obtains at this step the support 1 into which only the second succession of micropits marked 7 in the drawings is transferred. Then one removes by all appropriate means all the residual resin.

The master disk or the optical disk thus obtained is illustrated in step (e). It is constituted of the support 1 comprising on its surface a succession of micropits 7 representative of the information to be duplicated, only.

From the obtained master disk, after one step of depositing a conductive metallic material, one can realize a pressing die usable for the manufacture of optical disks with a galvanoplasty step.

The master disk or the optical disk illustrated in step (e) may be coated with a layer of hard, reflecting in the near infrared range and conductive material 9. And one will obtain a master disk or an optical disk 10, illustrated in step (f) of FIG. 1, constituted of the support 1 comprising a succession of micropits 7 representative of the information to be duplicated or to be read, coated with the layer of material 9.

The material 9 will have to be hard and not easily scratchable so that it may be easily handled and have a long operating life from the mechanical standpoint in order to enable the manufacture of many dies without these repeated manufactures modifying or altering the shape of the micropits or their depth. It should have a very good adherence onto the support 1, in particular onto the glass and aluminium so as to remove any risk of being torn away during the subsequent step of galvanoplasty which will lead to the obtainment of the pressing die. It should be conductive to permit the step of galvanoplasty for manufacturing a pressing die of optical disks without previous treatment of the master disk 10. It should also be chemically stable so as to be resistant in chemical baths and to have a long operating life in difficult environments and lastly it should be reflecting in the range of wavelengths used in readers of optical disks. At the present time, the wavelengths used in readers of optical disks are in the range of the near infrared, more accurately about 780 nm. However, it is not excluded from the invention that the material 9 be reflecting in the range of the visible and/or ultraviolet wavelengths in case where an evolution in the technology of readers of optical disks would permit to use them with such wavelengths.

In this respect, one nitride or carbonitride of zirconium, hafnium or titanium is a particularly appropriate material. Indeed these materials are hard, reflecting in the near infrared, ultraviolet and visible ranges and conductive.

One particularly prefers the nitride of titanium.

Thus, the obtained master disk 10 can be readable in a reader of optical disks. Due to its very long operating life, this master disk will also be usable for archiving information. The information that it contains will not be deteriorated or modified by the manufacture of new pressing dies.

Of course, in this embodiment, the support 1 may also be constituted of aluminium or of any other material appropriate for the manufacture of optical disks or master disks.

EXAMPLE 2

Referring to FIG. 2, the first step marked (a) of this embodiment of the invention consists in depositing onto a support 1 made of a nitride of titanium a layer 2 of photosensitive resin having a thickness of 1 μm.

One records as a latent image, in this layer 2 of photosensitive resin, the preformatting signal, by irradiating with a light beam 3 through a mask comprising the preformatting signal.

Then one removes the zones of insolated resin, down to a depth of 75 nm.

One thus obtains the preformatted substrate according to the invention illustrated in step (b) of FIG. 2 constituted of the support 1 made of nitride of titanium coated with a layer 2 of photosensitive resin comprising at its surface a first succession of micropits or first groove 4 the depth of which is smaller than the thickness of the layer 2 of photosensitive resin and which is representative of the preformatting signal.

In step (c) of FIG. 2, one records, as a latent image, the information to be duplicated with a light radiation 8, by using a recorder of the WORM type, within the zones 5 not yet insolated of the layer 2 of photosensitive resin.

Then one removes, by any appropriate means, the zones of resin comprising the information as a latent image, and this down to the surface of the support 1.

Thus one obtains the preformatting substrate comprising the information illustrated in step (c) of FIG. 2, constituted of the support 1 made of nitride of titanium coated with a layer 2 of photosensitive resin, this layer 2 of photosensitive resin comprising a first succession of micropits or first groove 4 representative of the preformatting signal, the thickness of the micropits or groove being smaller than the thickness of the layer 2 of the photosensitive resin and a second succession of micropits 6 extending down to the surface of support 1 and representative of the information to be duplicated.

Then in step marked (d) in FIG. 2, one transfers the information to be duplicated in the support 1 by etching through reactive plasma and one thus obtains in the support 1 a succession of micropits 7 representative of the information to be duplicated.

Step (e) illustrated in FIG. 2 is a step of removal of all the residual resin.

Thus one finally obtains an optical disk or a master disk 10 constituted of the support 1 made of nitride of titanium the surface of which comprises a succession of the micropits 7 representative of the information to be duplicated.

The master disk or optical disk 10 obtained here being constituted of the material 9 previously described, will have the same advantages as those described in example 1.

In this particular embodiment, the support 1 could also be constituted of ceramics or glasses which are hard, reflecting in the near infrared range and conductive on their surface only while keeping the advantages of the master disk the support of which is either constituted of the material 9 or coated with the material 9.

Of course, in this embodiment, one could also use a dealkalinized and/or tempered glass or aluminium as a material for the support 1. In this case, one could also, as in example 1, subsequently coat the etched support 1 with a layer of material 9.

EXAMPLE 3

Referring to FIG. 3, the first step marked (a) consists in depositing onto a support 1 made of aluminium a layer of hard, reflecting in the near infrared range and conductive material 9 such as defined previously, then depositing a layer 2 of photosensitive resin with a thickness of 500 nm onto this layer of material 9.

By pressing a die comprising the preformatting signal, one creates into the layer 2 of photosensitive resin a first succession of micropits or first groove 4 with a depth of 75 nm, representative of the preformatting signal.

One thus obtains a preformatted substrate according to the invention illustrated in step (b) of FIG. 3 constituted of the support 1 made of aluminium coated with a layer of material 9, this layer of material 9 being itself coated with a layer 2 of photosensitive resin comprising on its surface a first succession of micropits or first groove 4 representative of the preformatting signal and the depth of which is smaller than the thickness of the layer 2 of photosensitive resin, and zones 5 of resin which have not undergone any stress.

Then one records the information to be duplicated in the zones 5 of resin having not undergone any stress, as a latent image, by having a light beam 8 modulated in accordance with the signal to be encoded moving past.

Then one removes the zones of irradiated resin, by any appropriate means. This removal permits to remove all the irradiated resin down to the surface of the layer of material 9.

One thus obtains the preformatted substrate comprising the information according to the invention illustrated in step (c) of FIG. 3, which substrate is constituted of the support 1 made of aluminium, coated with the layer of material 9, itself coated with a layer 2 of photosensitive resin comprising a first succession of micropits or first groove 4 representative of the preformatting signal the depth of which is smaller than the thickness of the layer 2 of photosensitive resin, and a second succession of micropits 6 the depth of which is equal to the thickness of the layer of photosensitive resin within the zones in which they are created.

Step (d) illustrated in FIG. 3 is a step of transferring the information to be duplicated into the layer of material 9 and of removal of the zones of residual resin.

Thus one obtains the master disk or the optical disk 10 illustrated in step (e) of FIG. 3 constituted of the support 1 made of aluminium coated with a layer of material 9 comprising a succession of micropits representative of the information to be duplicated.

The master disk or the optical disk 10 thus obtained will permit the realization of many pressing dies of optical disks, by a mere step of galvanoplasty, while not necessitating any previous preparation.

Because the micropits are constituted of the hard, reflecting in the near infrared range and conductive material 9, this master disk and this optical disk will be readable in readers of optical disks, without special preparation and, the material 9 being very hard, the information will not be either modified or deteriorated during the manufacture of pressing dies.

Consequently they can be used for a long term storage of the information.

Of course, the invention is not at all limited to the embodiments described and illustrated which have been given by way of examples only.

On the contrary, it comprises all the technical equivalents of the means described as well as their combination if the latter are carried out according to its spirit and within the scope of the appended claims.

What is claimed is:

1. A process of manufacture of a master disk and/or of an optical disk, comprising the steps of:

depositing onto a support a layer of a resin sensitive to at least one stress, transferring into the layer of sensitive resin a preformatting signal, this transfer leading to the creation of a first succession of micropits or first groove representative of the preformatting signal, the depth of these micropits or groove being smaller than the thickness of the layer of sensitive resin by applying a first stress, recording into the layer of sensitive resin the information to be duplicated by applying a second stress, this recording leading to the creation of a second succession of micropits representative of the information to be duplicated, the depth of the micropits of the second succession being equal to the thickness of the layer of sensitive resin within the zones where they are created, transferring the information into the substrate, thereby leading to the creation of micropits into the substrate, and removing the zones of residual resin, the master disk or the optical disk thus obtained comprising the information to be duplicated only and not the preformatting signal.

2. The process according to claim 1, further comprising, after the step of removal of the residual resin, depositing, onto said micropitted support, a layer of a material which is hard, which reflects in the near infrared range and which is conductive.

3. The process according to claim 1 wherein said second succession of micropits is created under the first succession of micropits or first groove.

4. The process according to claim 1, wherein said second succession of micropits is created within zones of resin different from those located under the first succession of micropits or first groove.

5. The process according to claim 1 wherein the thickness of the layer of sensitive resin is between about 100 nm and about 1 µm, and wherein the depth of the micropits of the first succession of micropits is about 75 nm.

6. The process according to claim 1, wherein the support is made of glass.

7. The process according to claim 6, further comprising depositing a layer of material which is hard, which reflects in the near infrared range and which is conductive between the support and the layer of sensitive resin, wherein the information is transferred in this case into said layer of hard, reflective and conductive material.

8. The process according to claim 7 wherein the hard, reflective and conductive material is selected from the group consisting of a nitride or carbonitride of zirconium, hafnium and titanium.

9. The process according to claim 1, wherein the support is made of aluminum.

10. The process according to claim 1, wherein the substrate is made of a material which is hard, which reflects in the near infrared range and which is conductive.

11. The process according to claim 10 wherein the hard, reflective and conductive material is selected from the group consisting of a nitride or carbonitride of zirconium, hafnium and titanium.

* * * * *